No. 713,347. Patented Nov. 11, 1902.
J. J. REILLY.
T-COUPLING FOR PIPES.
(Application filed Jan. 6, 1902.)
(No Model.)
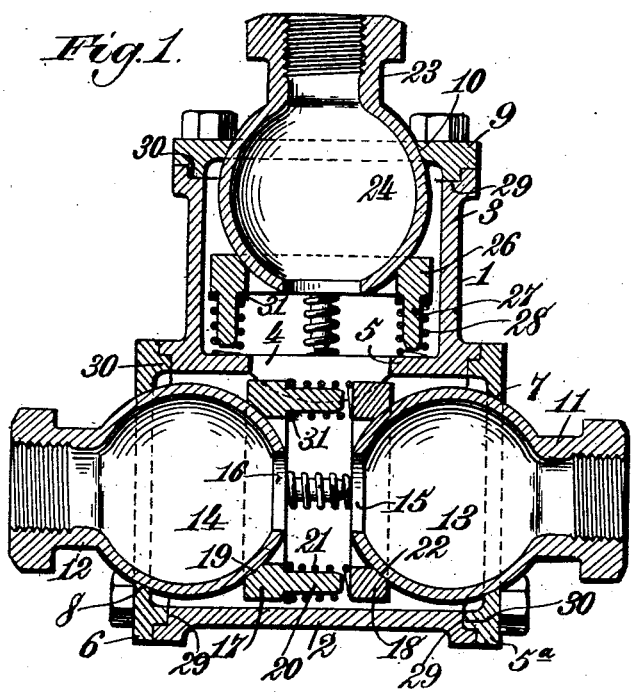
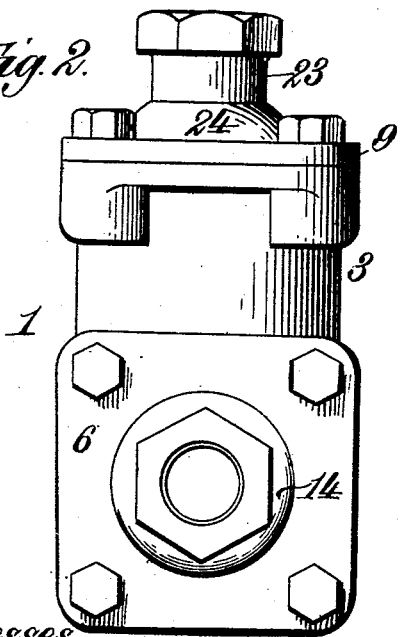
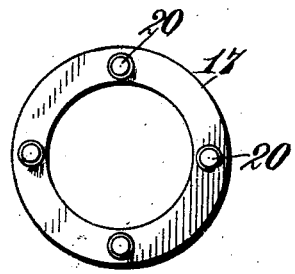
Witnesses.
Inventor,
John J. Reilly.
By
Atty.

UNITED STATES PATENT OFFICE.

JOHN J. REILLY, OF LOUISVILLE, KENTUCKY.

T-COUPLING FOR PIPES.

SPECIFICATION forming part of Letters Patent No. 713,347, dated November 11, 1902.

Application filed January 6, 1902. Serial No. 88,636. (No model.)

*To all whom it may concern:*

Be it known that I, JOHN J. REILLY, a citizen of the United States of America, residing at Louisville, in the county of Jefferson and State of Kentucky, have invented certain new and useful Improvements in T-Couplings for Pipes, of which the following is a specification.

My invention is designed for the production of an improved flexible T-coupling for pipes and the like, the object of the same being to provide novel means whereby a series of pipes may be connected one with the other, with the provision of means for maintaining close joints between the different parts of the coupling at all points.

Certain other objects of the invention will hereinafter appear.

The invention consists of a casing having a series of openings therein at three different points, caps secured to the open ends of said casing provided with openings surrounded by annular bearing-surfaces, coupling-sections having hollow balls or spherical enlargements thereon extending into said casing, a spring or series of springs acting in opposite directions upon two of said balls for maintaining the same in constant contact with two of said bearing-surfaces, and a spring or set of springs located within said casing and acting upon a fixed part thereof and upon the other of said balls for maintaining the latter in constant contact with the bearing-surface with which it coöperates.

The invention also consists in certain features and details of construction and combinations of parts, which will be hereinafter more fully described and claimed.

In the drawings forming part of this specification, Figure 1 is a sectional view of a T-coupling constructed in accordance with my invention. Fig. 2 is an end elevation of the same, and Fig. 3 is a detail view of one of the presser-blocks.

Like reference-numerals indicate like parts in the different views.

The casing 1 is formed with a cylindrical body 2 and with a cylindrical extension 3 at right angles thereto. The body 2 communicates with the extension 3 through an opening 4, around which is formed an inwardly-extending flange or ledge 5, which is integral with the casing 1. The opposite ends of the body 2 of the casing have bolted or otherwise secured to them the caps 5ª 6, provided with openings which are surrounded by annular bearing-surfaces 7 8. The end of the extension 3 also has bolted or otherwise secured to it a cap 9, which is provided with a central opening surrounded by an annular bearing-surface 10. The coupling-sections 11 and 12 are formed with hollow balls or spherical enlargements 13 14, which extend into the body 2 of the casing, are provided with openings 15 and 16, and are adapted to seat against the bearing-surfaces 7 and 8, respectively, to form flexible joints. The said bearing-surfaces 7 and 8 are ground with the same curvature as the exterior surfaces of the balls 13 and 14, so that said balls may seat against said bearing-surfaces to form close joints in any positions to which they may be moved. Located within the body 2 of the casing between the balls 13 and 14 are the presser-blocks 17 and 18. The presser-block 17 is formed with an annular concave surface 19, which lies in contact with the ball 14 of the section 12 and is also provided with longitudinally-extending fingers or projections 20. I have shown in the drawings four of such fingers or projections; but it is obvious that any other suitable number may be employed. Surrounding the fingers or projections 20 are the coil-springs 21, which act upon the presser-blocks 17 and 18 to separate the same and force them into engagement with the balls 14 and 13, respectively. The presser-block 18 is provided with an annular curved surface 22, similar to the annular surface 19 on the presser-block 17. As the presser-blocks 17 and 18 are forced apart by the springs 21 into engagement with the balls 14 and 13, respectively, said springs thereby act to force said balls outwardly and to maintain the same in constant contact with the bearing-surfaces 8 and 7. The balls 13 and 14 are held against displacement from the bearing-surfaces 7 and 8, and consequently a close impervious joint is maintained at each of these points at all times. As this constant contact is maintained, the danger of corrosion of the bearing parts is avoided, and consequently the leaky joints produced by such corrosion are obviated.

The coupling-section 23 is provided with a hollow ball or spherical enlargement 24, similar in all respects to those heretofore referred to, and the bearing-surface 10 on the cap 9, with which the ball 24 coöperates, is similar in all respects to the bearing-surfaces 7 and 8. Located within the extension 3 of the casing 1, between the ball 24 and the flange or ledge 5, is a presser-block 26, similar in all respects to the presser-block 17, heretofore referred to, the same being provided with longitudinally-extending fingers or projections 27, which are surrounded by the coil-springs 28, as clearly shown. The said springs 28 act at one end against the ledge or shoulder 5 and at the other end against the presser-block 26 to force the latter away from said ledge or shoulder into engagement with the ball 24. The result of this action is to force said ball 24 outwardly and maintain close contact at all times between said ball and the bearing-surface 10, with which it coöperates.

Now it will be observed that by the construction described any one or all of the coupling-sections 11, 12, and 23 may be turned or moved in any direction with respect to each other or to the casing 1 without in any way affecting the joints between the said sections and said casing. Impervious joints are maintained by the provision of the springs 21 and 28, which serve to force the balls or spherical enlargements on said coupling-sections outwardly into contact with the bearing-surfaces with which they coöperate.

It is of course essential that close joints be produced between the caps 5ª, 6, and 9 and the ends of the casing 1, to which said caps are secured. This result is effected by rabbeting each end of the body 2 and the end of the extension 3 to form annular grooves or recesses 29 and rabbeting the inner faces of the caps 5ª, 6, and 9 to form the annular ribs or tongues 30. The said ribs or tongues fit tightly within said grooves and prevent leakage at these points into or from the casing 1. Washers 31 may also be employed, if desired, on the fingers 20 and 27 for adjusting the tension of the springs 21 and 28.

In an application for patent filed by me concurrently herewith, Serial No. 88,634, I have shown, described, and claimed the presser-blocks 17 and 18 and the springs 21, surrounding the fingers 20 and serving to move the balls 13 and 14 outwardly into engagement with the bearing-surfaces 7 and 8. I do not, therefore, claim such construction broadly herein; but What I do claim, and desire to secure by Letters Patent, is—

1. In a T-coupling for pipes and the like, the combination with a casing comprising a body and an extension communicating therewith and leading outwardly therefrom, annular bearing-surfaces surrounding openings at the ends of said body and at the end of said extension, and coupling-sections having balls or spherical enlargements thereon extending into said casing at the opposite ends of said body and at the end of said extension, of a spring acting in opposite directions upon the balls in said body to maintain the same in constant contact with the bearing-surfaces with which they coöperate, and a spring acting upon a stationary part and upon the ball which projects into said extension to force the same outwardly and maintain it in constant contact with the bearing-surface with which it coöperates.

2. In a T-coupling for pipes and the like, the combination with a casing comprising a body and an extension communicating therewith and leading outwardly therefrom, annular bearing-surfaces surrounding openings at the ends of said body and at the end of said extension, and coupling-sections having balls or spherical enlargements thereon extending into said casing at the opposite ends of said body and at the end of said extension, of a plurality of presser-blocks located within said body between the balls therein, a spring acting upon said presser-blocks to force the same outwardly into engagement with the balls in said body and to maintain the latter in constant contact with the bearing-surfaces with which they coöperate, a presser-block in said extension and a spring acting upon the latter presser-block and upon a stationary part for forcing the latter presser-block outwardly into engagement with the ball in said extension and maintaining the latter ball in constant contact with the bearing-surface with which it coöperates.

3. In a T-coupling for pipes and the like, the combination with a casing comprising a body and an extension communicating therewith and leading outwardly therefrom, annular bearing-surfaces surrounding openings at the ends of said body and at the end of said extension, and coupling-sections having balls or spherical enlargements thereon extending into said casing at the opposite ends of said body and at the end of said extension, of a plurality of presser-blocks in said body between the balls therein, a spring acting upon said presser-blocks to force the same apart into engagement with the balls in said body and to maintain the latter in constant contact with the bearing-surfaces with which they coöperate, a flange or ledge between the body of said casing and said extension, a presser-block in said extension and a spring interposed between the latter presser-block and said ledge or flange for forcing the same outwardly into engagement with the ball in said extension to maintain the latter ball in constant contact with the bearing-surface with which it coöperates.

4. In a T-coupling for pipes and the like, the combination with a casing comprising a body and an extension communicating therewith and leading outwardly therefrom, annular bearing-surfaces surrounding openings at the ends of said body and at the end of said extension, and coupling-sections having balls or spherical enlargements thereon extending into said casing at the opposite ends of said body and at the end of said extension, of a plurality of presser-blocks in said body between the balls therein, one of said presser-blocks being provided with a plurality of longitudinally-extending fingers or projections, coil-springs surrounding said fingers and acting upon said presser-blocks in opposite directions to force the same outwardly into engagement with the balls in said body and maintain the latter in constant contact with the bearing-surfaces with which they coöperate, a ledge or flange between the body of said casing and said extension, a presser-block in said extension having longitudinally-extending fingers or projections thereon, coil-springs surrounding the fingers on the latter presser-block and acting against said ledge or flange for forcing the latter presser-block outwardly into engagement with the ball in said extension to maintain the latter ball in constant contact with the bearing-surface with which it coöperates.

In testimony whereof I have hereunto set my hand in presence of two subscribing witnesses.

JOHN J. REILLY.

Witnesses:
 WM. M. STOCKBRIDGE,
 EWELL A. DICK.